(12) United States Patent
Krahn

(10) Patent No.: US 12,712,743 B2
(45) Date of Patent: Aug. 18, 2026

(54) PROTECTION ENVIRONMENT FOR ATTESTATION AND SEALING USING A DEVICE IDENTIFIER COMPOSITION ENGINE

(71) Applicant: Google LLC, Mountain View, CA (US)

(72) Inventor: Darren David Krahn, Saratoga, CA (US)

(73) Assignee: Google LLC, Mountain View, CA (US)

( * ) Notice: Subject to any disclaimer, the term of this patent is extended or adjusted under 35 U.S.C. 154(b) by 314 days.

(21) Appl. No.: 18/553,864

(22) PCT Filed: Jun. 17, 2022

(86) PCT No.: PCT/US2022/034010
§ 371 (c)(1),
(2) Date: Oct. 4, 2023

(87) PCT Pub. No.: WO2022/271554
PCT Pub. Date: Dec. 29, 2022

(65) Prior Publication Data

US 2024/0187260 A1 Jun. 6, 2024

Related U.S. Application Data

(60) Provisional application No. 63/214,679, filed on Jun. 24, 2021.

(51) Int. Cl.
*H04L 9/32* (2006.01)
*H04L 9/08* (2006.01)

(52) U.S. Cl.
CPC .......... *H04L 9/3268* (2013.01); *H04L 9/0877* (2013.01); *H04L 9/3226* (2013.01)

(58) Field of Classification Search
CPC ... H04L 9/0877; H04L 9/3226; H04L 9/3263; H04L 9/0891; H04L 9/3268; G06F 21/57; G06F 21/602; G06F 21/44
See application file for complete search history.

(56) References Cited

U.S. PATENT DOCUMENTS 10,819,696 B2 * 10/2020 Sinha .................. H04L 63/0442
2015/0039890 A1 * 2/2015 Khosravi .............. H04L 63/061
713/171

(Continued)

OTHER PUBLICATIONS

Bormman et al., “Concise Binary Object Representation (CBOR),” Internet Engineering Task Force (IETF), https://datatracker.ietf.org/doc/html/rfc8949, Dec. 2020, 70 pages.

(Continued)

*Primary Examiner* — Mohammad A Siddiqi
(74) *Attorney, Agent, or Firm* — McDonnell Boehnen Hulbert & Berghoff LLP

(57) ABSTRACT

Apparatus and methods related to receiving, by a secure component and from a client computing device via a secure communication channel, input data for a task associated with the client computing device, wherein the task is based on a device identifier composition engine (DICE) protocol, and wherein the secure component is to perform a cryptographic subtask of the task; receiving, by the secure component and from the client computing device via the secure communication channel, context data associated with the cryptographic subtask; executing, by the secure component, the cryptographic subtask based on the input data and the context data; and providing, by the secure component and to the client computing device via tiie secure communication channel, an output of the cryptographic subtask.

33 Claims, 5 Drawing Sheets

400

410 Receiving, by a secure component and from a client computing device via a secure communication channel, input data for a task associated with the client computing device, wherein the task is based on a device identifier composition engine (DICE) protocol, and wherein the secure component is to perform a cryptographic subtask of the task 420 Receiving, by the secure component and from the client computing device via the secure communication channel, context data associated with the cryptographic subtaskn channel between a secure component of the computing device and the DICE 430 Executing, by the secure component, the cryptographic subtask based on the input data and the context data 440 Providing, by the secure component and to the client computing device via the secure communication channel, an output of the cryptographic subtask

(56) References Cited

U.S. PATENT DOCUMENTS

| | | | | |
|---|---|---|---|---|
| 2017/0201373 | A1 | 7/2017 | Vijayakumar et al. | |
| 2018/0205539 | A1* | 7/2018 | Le Saint | H04W 12/041 |
| 2019/0042729 | A1* | 2/2019 | Desai | G06F 13/382 |
| 2019/0042732 | A1* | 2/2019 | Desai | G06F 21/51 |
| 2019/0278913 | A1 | 9/2019 | Ndu et al. | |
| 2020/0193065 | A1 | 6/2020 | Smith | |
| 2020/0313890 | A1* | 10/2020 | Mondello | H04L 9/3239 |
| 2020/0313909 | A1 | 10/2020 | Mondello et al. | |
| 2020/0356673 | A1 | 11/2020 | Xu | |
| 2022/0245252 | A1* | 8/2022 | Smith | G06F 21/572 |

OTHER PUBLICATIONS

"DICE Attestation Architecture," Trusted Computing Group, 2020, 36 pages, Version 1.00, Revision 0.22.

"DICE," Trusted Computing Group, https://trustedcomputinggroup.org/work-groups/dice-architectures/, downloaded Oct. 3, 2023, 2 pages.

Huber et al., "The Lazarus Effect: Healing Comprised Devices in the Internet of Small Things," Designing Interactive Systems Conference, CM, Oct. 5, 2020, pp. 6-19.

International Searching Authority, International Search Report and Written Opinion mailed Sep. 23, 2022, issued in connection with International Patent Application No. PCT/US2022/034010, filed Jun. 17, 2022, 16 pages.

"Open Profile for DICE," https://pigweed.googlesource.com/open-dice/+/refs/heads/main/docs/specification.md, downloaded Oct. 3, 2023, 23 pages.

Perrin, Treveor, "Noise Protocol Framework," http://noiseprotocol.org/noise.html, Jul. 11, 2018, 64 pages.

Sun et al., "eTPM: A Trusted Cloud Platform Enclave TPM Scheme Based on Intel SGX Technology," Sensors, Nov. 2018, 22 pages, vol. 18, No. 3807.

Tao et al., "DICE: A Formally Verified Implementation of DICE Measured Boot," USENIX, The Advanced Computer Systems Association, Apr. 2, 2021, pp. 1-17.

Winderickx, Jori, "Energy-efficient secure implementations for the IoT," Arenberg Doctoral School, Faculty of Engineering Technology, Mar. 2020, 190 pages.

* cited by examiner

Figure 4:
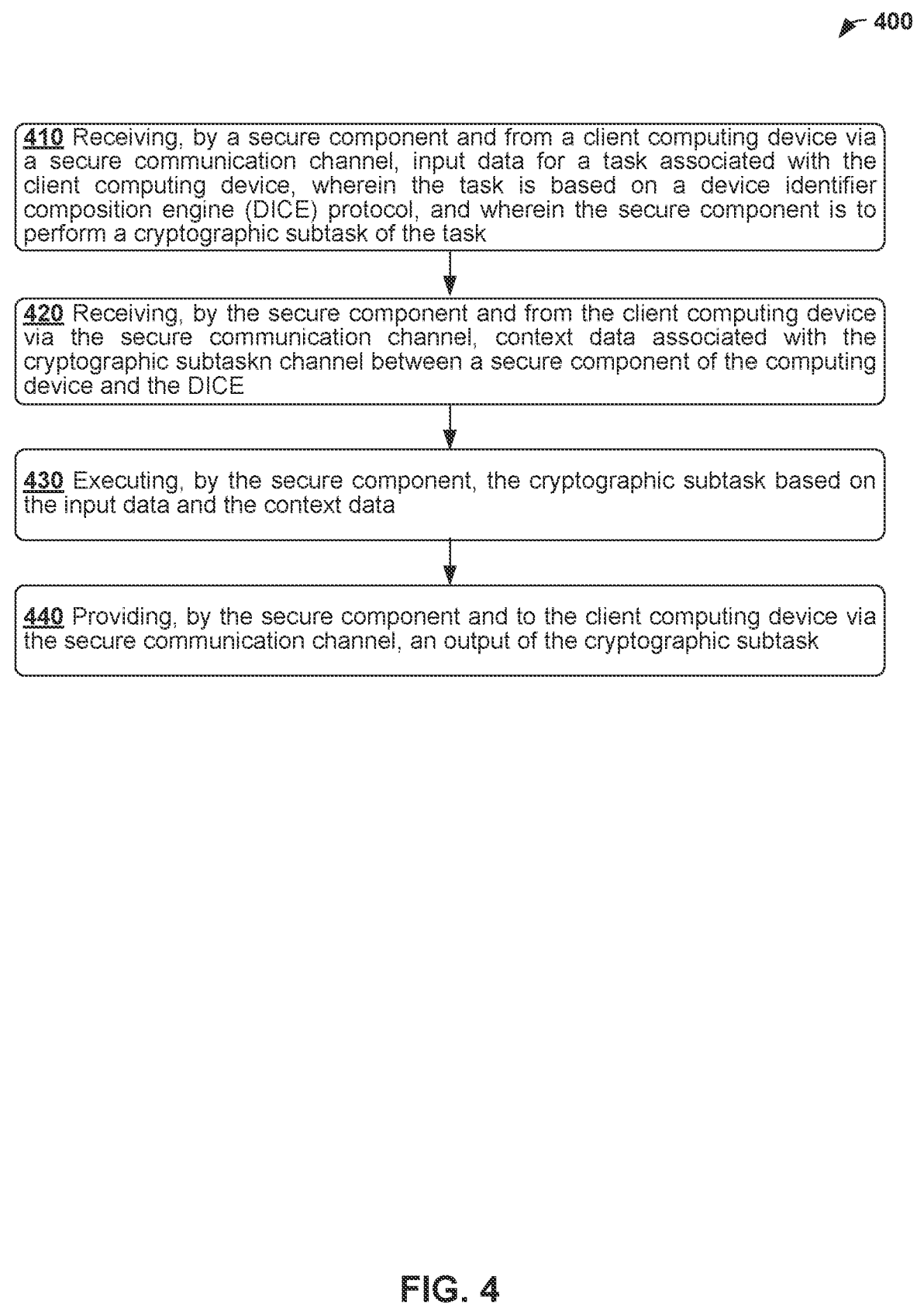

400

410 Receiving, by a secure component and from a client computing device via a secure communication channel, input data for a task associated with the client computing device, wherein the task is based on a device identifier composition engine (DICE) protocol, and wherein the secure component is to perform a cryptographic subtask of the task 420 Receiving, by the secure component and from the client computing device via the secure communication channel, context data associated with the cryptographic subtaskn channel between a secure component of the computing device and the DICE 430 Executing, by the secure component, the cryptographic subtask based on the input data and the context data 440 Providing, by the secure component and to the client computing device via the secure communication channel, an output of the cryptographic subtask

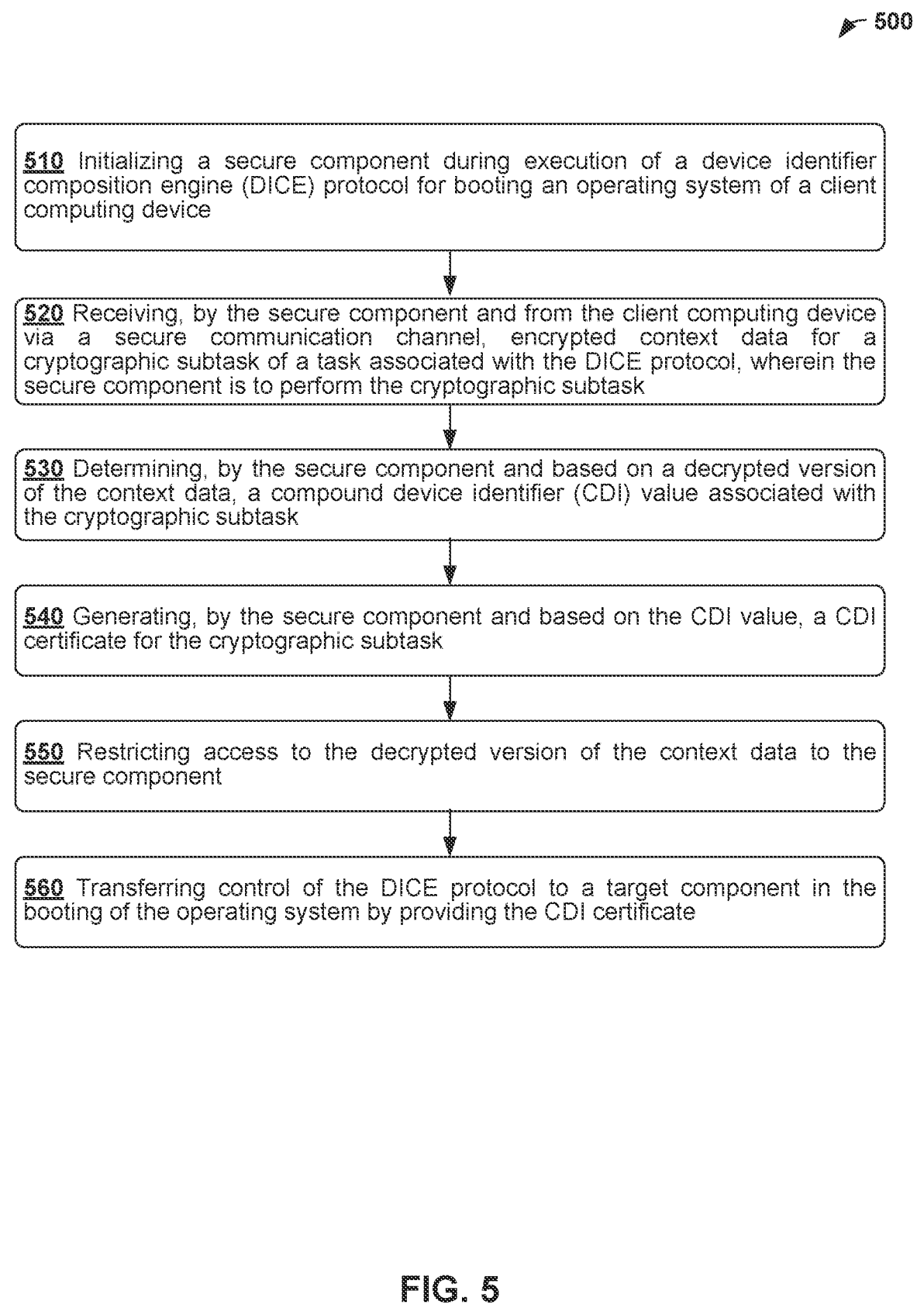

510 Initializing a secure component during execution of a device identifier composition engine (DICE) protocol for booting an operating system of a client computing device 520 Receiving, by the secure component and from the client computing device via a secure communication channel, encrypted context data for a cryptographic subtask of a task associated with the DICE protocol, wherein the secure component is to perform the cryptographic subtask 530 Determining, by the secure component and based on a decrypted version of the context data, a compound device identifier (CDI) value associated with the cryptographic subtask 540 Generating, by the secure component and based on the CDI value, a CDI certificate for the cryptographic subtask 550 Restricting access to the decrypted version of the context data to the secure component 560 Transferring control of the DICE protocol to a target component in the booting of the operating system by providing the CDI certificate

FIG. 5

PROTECTION ENVIRONMENT FOR ATTESTATION AND SEALING USING A DEVICE IDENTIFIER COMPOSITION ENGINE

CROSS-REFERENCE TO RELATED APPLICATIONS/INCORPORATION BY REFERENCE

This application is a national stage entry of International Patent Application No. PCT/US2022/034010, filed Jun. 17, 2022, which claims benefit of U.S. Provisional Patent Application No. 63/214,679, filed on Jun. 24, 2021, the disclosures of which are hereby incorporated by reference in their entirety.

BACKGROUND

Standard Device Identifier Composition Engine (DICE) is a standard for security threat mitigation. Standard DICE may result in design and security disadvantages that could result in challenges in secure use in a complex system. Computations performed by DICE may inherit such disadvantages from firmware or software components on which DICE is based.

SUMMARY

In one aspect, a computer-implemented method is provided. The method involves receiving, by a secure component and from a client computing device via a secure communication channel, input data for a task associated with the client computing device, wherein the task is based on a device identifier composition engine (DICE) protocol, and wherein the secure component is to perform a cryptographic subtask of the task. The method also involves receiving, by the secure component and from the client computing device via the secure communication channel, context data associated with the cryptographic subtask. The method further involves executing, by the secure component, the cryptographic subtask based on the input data and the context data. The method also involves providing, by the secure component and to the client computing device via the secure communication channel, an output of the cryptographic subtask.

In another aspect, a computing device is provided. The computing device includes one or more processors and data storage. The data storage has stored thereon computer-executable instructions that, when executed by one or more processors, cause the computing device to carry out functions. The functions include: receiving, by a secure component and from a client computing device via a secure communication channel, input data for a task associated with the client computing device, wherein the task is based on a device identifier composition engine (DICE) protocol, and wherein the secure component is to perform a cryptographic subtask of the task; receiving, by the secure component and from the client computing device via the secure communication channel, context data associated with the cryptographic subtask; executing, by the secure component, the cryptographic subtask based on the input data and the context data; and providing, by the secure component and to the client computing device via the secure communication channel, an output of the cryptographic subtask.

In another aspect, a computer program is provided. The computer program includes instructions that, when executed by a computer, cause the computer to carry out functions. The functions include: receiving, by a secure component and from a client computing device via a secure communication channel, input data for a task associated with the client computing device, wherein the task is based on a device identifier composition engine (DICE) protocol, and wherein the secure component is to perform a cryptographic subtask of the task; receiving, by the secure component and from the client computing device via the secure communication channel, context data associated with the cryptographic subtask; executing, by the secure component, the cryptographic subtask based on the input data and the context data; and providing, by the secure component and to the client computing device via the secure communication channel, an output of the cryptographic subtask.

In another aspect, an article of manufacture is provided. The article of manufacture includes one or more computer readable media having computer-readable instructions stored thereon that, when executed by one or more processors of a computing device, cause the computing device to carry out functions. The functions include: receiving, by a secure component and from a client computing device via a secure communication channel, input data for a task associated with the client computing device, wherein the task is based on a device identifier composition engine (DICE) protocol, and wherein the secure component is to perform a cryptographic subtask of the task; receiving, by the secure component and from the client computing device via the secure communication channel, context data associated with the cryptographic subtask; executing, by the secure component, the cryptographic subtask based on the input data and the context data; and providing, by the secure component and to the client computing device via the secure communication channel, an output of the cryptographic subtask.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

BRIEF DESCRIPTION OF THE FIGURES

FIG. 4 is a flowchart of a method, in accordance with example embodiments.

FIG. 5 is another flowchart of a method, in accordance with example embodiments.

DETAILED DESCRIPTION

Figure 1:
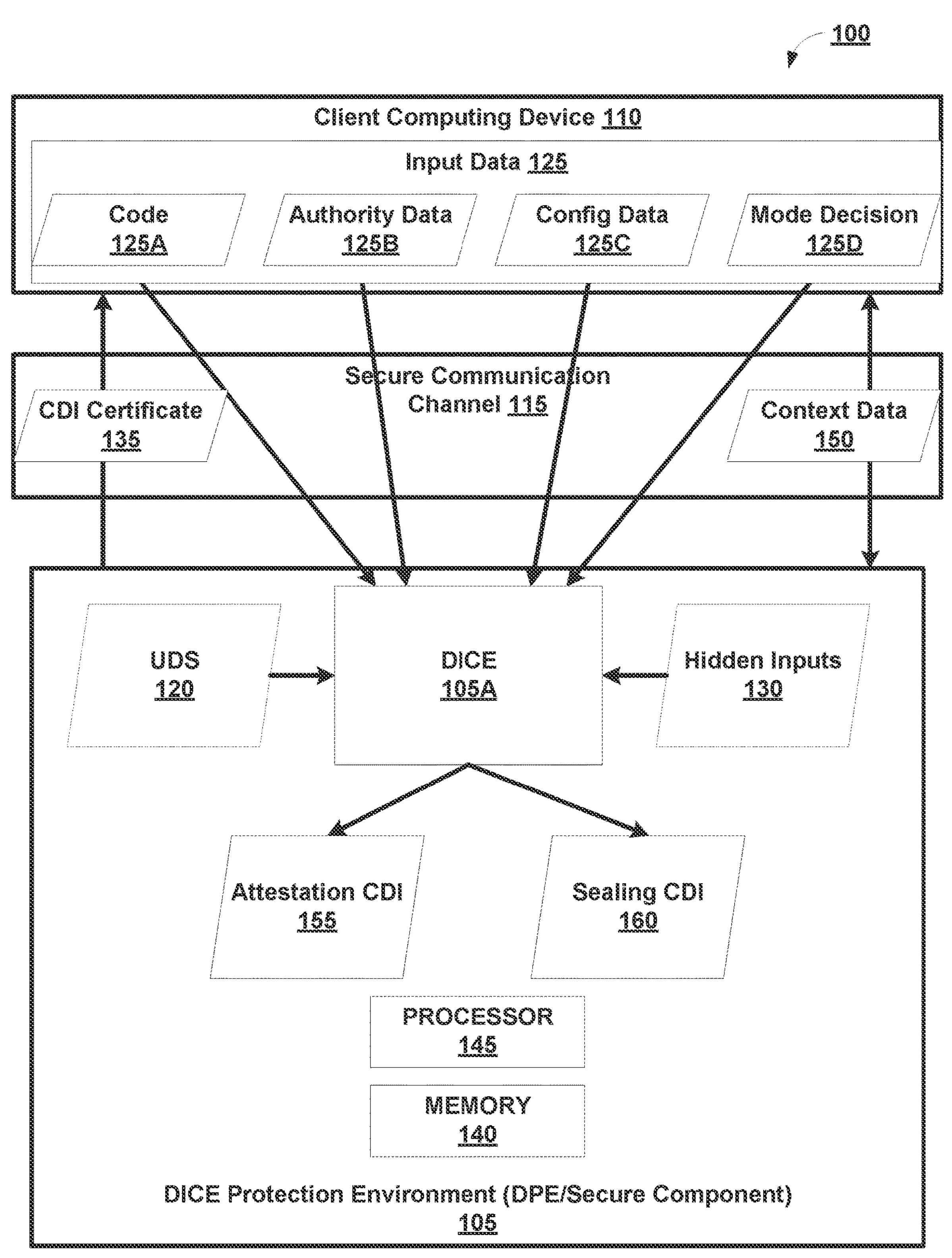
FIG. 1 is a diagram illustrating an example architecture for a DICE protection environment (DPE), in accordance with example embodiments.

Example methods, devices, and systems are described herein. It should be understood that the words “example” and “exemplary” are used herein to mean “serving as an example, instance, or illustration.” Any embodiment or feature described herein as being an “example” or “exemplary” is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Overview

This application generally relates to technologies that enable mitigation of real and/or potential security threats. As described herein, a protected environment can be designed to protect sensitive data for DICE-based attestation and scaling to ensure secure and efficient operations, and to enforce attestation and sealing binding policies. DICE is a standard for security threat mitigation and is published by the TRUSTED® COMPUTING GROUP (TCG). In some instances, standard DICE may result in design and security disadvantages that may result in challenges in secure use in a complex system. For example, as the complexity of a system increases, so does the volume of inputs, outputs, and associated computations performed by a system implementing DICE. This is, in turn, associated with an increase in the amount of cryptographic tasks to be performed, and/or confidential information associated with DICE (DICE secrets). In some situations, such disadvantages may be inherited from firmware or software components on which DICE is based and/or hosted. For example, a system may be compromised during a boot process and DICE measurements may be spoofed in an undetectable manner, or DICE secrets may be exfiltrated. As another example, a system component that retains DICE secrets for ongoing use (e.g., hypervisors, kernels, and so forth) may be compromised after boot, and subsequent DICE measurements may be spoofed in an undetectable manner, or DICE secrets may be exfiltrated. Also, for example, a hostile agent may gain access to DICE secrets by observing leaks (e.g., a swap or a hibernation persisted memory, random access memory (RAM) freeze, bus logging, and so forth), observing side-channels (e.g., data processing advisor (DPA), electromagnetic (EM) emissions, speculative execution, and so forth), or by injecting errors.

DICE implementations may also have performance challenges early in a boot process when crypto-acceleration is not initialized, or when a core is running on a slower clock. Generally, DICE may present several challenges for sealing use cases. Compound device identifiers (CDIs) may be significantly brittle to use for sealing. For example, if the sealing key changes on every firmware update, or if the brittleness is reduced to give a consistent key across updates, the sealing key may no longer offer protection from older firmware or software.

As described herein, a DICE Protection Environment (DPE) can be configured to address the challenges stated above. In this description, the terms DPE and "secure component" may be used interchangeably. In some implementations, one or more policies associated with context data associated with the DICE protocol may be managed by the DPE, where the one or more policies are configured to prevent one or more of: data leakage of the context data, unauthorized access to the context data, or exfiltration of the context data. The term "context data" as used herein can generally refer to data that is exchanged between a system that performs DICE operations and a computing environment, and the context data indicates an internal state of the system that performs the DICE operations. Generally, DPE can protect DICE secrets from exfiltration, leakage, and unauthorized access. In some example implementations, the DPE can protect against entire classes of security threats. In some embodiments, the secure component may accelerate a cryptographic subtask. For example, the DPE can be configured to optimize a process performed based on the DICE protocol using a variety of techniques, such as, for example, by caching inputs and performing computations in the background or on demand, and/or by providing an environment with crypto-acceleration early during a boot process. In some embodiments, the secure component may implement a versioned key derivation function (KDF) for sealing, wherein one or more version clamps are set during boot, and enforced for sealing key derivation. For example, DPE can implement a versioned KDF for sealing where appropriate version clamps can be set during a boot process, and/or enforced for sealing key derivation.

In general, there may be many possible implementations of a DPE, and the corresponding security protection and/or performance optimizations provided by a particular implementation may be nuanced. In some aspects, a specification for a command interface and a protocol that defines a DPE is described, along with a corresponding data model for interface inputs and outputs. A format of DICE inputs, certificates, and so forth, may depend on a target system or ecosystem, and can be described, for example, in a DPE Profile specification.

A TPG makes available a Trusted Platform Module (TPM). The TPM is configured to enforce specific policies and protects a system against unauthorized access by hostile applications, such as malware and rootkits. Standards-based Trusted Computing technologies developed by TCG members are deployed in enterprise systems, storage systems, networks, embedded systems, and mobile devices, and can secure cloud computing and virtualized systems.

Although in some implementations, the same environment described herein can implement both a TPM and a DPE, these operations may be generally distinct, and neither may depend on the other. For example, a DPE is relatively simpler than a TPM, and a vendor can implement a DPE without a need for familiarity with the TPM specification. Such mutual independence frees the DPE design to use modern secure channels and standard encodings, such as, for example, a Noise Protocol Framework, and Concise Binary Object Representation (CBOR).

FIG. 1 is a diagram illustrating an example architecture 100 for a DICE protection environment (DPE) 105, in accordance with example embodiments.

Some embodiments involve receiving, by a secure component (e.g., DPE 105) and from client computing device 110 via a secure communication channel 115, input data for a task associated with the client computing device 110, wherein the task is based on a device identifier composition engine (DICE) protocol 105A, and wherein the secure component 120 is to perform a cryptographic subtask of the task. As used herein, the terms "DICE protocol" and "DICE" may be used interchangeably to mean a collection of operations that are performed based on a device identifier task. In some embodiments, DICE 105A may be a component that performs authentication related operations in client computing device 110. Such operations may be performed during a transition from hardware to software during a boot process, or during transfer from a software code to another.

In some embodiments, DPE 105 may identify that client computing device 110 is initiating a DICE protocol, and in response to the identifying, DPE 105 may establish secure communication channel 115. For example, secure communication channel 115 may be configured to apply one or more security protocols that prevent unauthorized access to context data. In some embodiments, secure communication channel 115 can be configured to enable transmission of encrypted data, enable unidirectional flow of selected data, and so forth. In some embodiments, the secure component DPE 105 can delete the context data subsequent to the executing of the cryptographic subtask. For example, DPE 105 can enable deletion of data after one-time use.

In some embodiments, DPE 120 can be a second computing device communicatively linked to the client computing device 110. In some embodiments, DPE 120 can be hosted in a secured environment in the client computing device 110.

DICE 105A may determine an identity value, also called a CDI, and generate a CDI Certificate 135. The CDI is derived from a unique device secret (UDS) 120. UDS 120 is a per-device hardware level secret that may be accessible to DICE 105A. In some implementations, UDS 120 may not be accessible to DICE 105A after DICE 105A starts running. Also, for example, in some implementations, UDS 120 may be stored in a secure component of the client computing device 110, such as for example, DPE 120. In other embodiments, UDS 120 can be stored in client computing device 110. In some embodiments, TCG can specify hardware requirements for DICE 105A. As used herein, the term "hardware" may generally refer to anything that is immutable by design after being manufactured. The terms "software," "firmware," and "program" may be used interchangeably.

In some embodiments, the CDI can be an identity value that represents a combination of hardware and software as measured by DICE 105A. The CDI is an output of DICE 105A, and can be provided to a software program that is measured by DICE 105A. Generally, DICE 105A may be configured to run a process that mixes UDS 120 with software hashes and other inputs to produce the CDI, and can lock down further access to UDS 120. DICE 105A may perform its operations at a time of transition from hardware to software, but the operations may also be performed during a transition from one program to another.

DICE 105A may take one or more inputs in the form of input data 125, such as, for example, code 125A, authority data 125B, configuration (config) data 125C, and mode decision 125D. Code 125A may be computed by hashing a target software code. In some embodiments, a descriptor or representative of the software code may be hashed. Authority data 125B can be computed by hashing a representation of a verified boot authority. In some examples, authority data 125B can be a public key, a set of public keys, a hash of a public key, and so forth. Config data 125C can be any security related configuration data and/or system environment properties that are indicative of an integrity of a system. For example, config data 125C can be used by an external party to validate itself. Also, for example, config data 125C can be used by an external party to validate a state that the party is operating in. Mode decision 125D is generally a single-byte mode value indicating whether a mode is not configured, if it is a normal mode, a debugging mode, or a recovery mode. Generally, mode decision 125D is determined during runtime based on code 125A, authority data 125B, and/or config data 125C. Hidden inputs 130 can represent an optional input for DICE 105A. Hidden inputs 130 may be used in attestation and sealing, even though it may not appear in any shared certificate, such as CDI certificate 135.

DICE 105A may perform operations such as attestation and scaling. The term "attestation" as used herein can refer to a process whereby a client computing device 110 can verify itself and/or an operating state that the client computing device 110 is in. The operating state can include its hardware identity, a software image for a software application, any security related configuration, and so forth. The term "sealing" generally refers to a process whereby data is encrypted in a manner that the encrypted data can be decrypted by the same device (as the one that encrypted it), or by a program operating in the same environment state (as when the data was encrypted).

Although a traditional version of DICE may perform the operations of attestation and sealing, such operations generally involve the use of data that can be encrypted, generation of CDI values and other secrets, encryption and decryption of data, and so forth. In such implementations, the data can be stored across various components of client computing device 110. For example, when DICE 105A is run during a transition from one software code to another, data related to attestation and sealing may be stored in different caches, and such data may give rise to a plethora of security vulnerabilities, including data leak, data loss, data theft, and so forth. Accordingly, there is a need to protect the CDIs and other secrets. Accordingly, DPE 105 can be configured to be a secured component that can be a repository of the CDIs and other secrets. For example, DPE 105 can store the CDIs and other secrets in memory 140. In some embodiments, DPE 105 may alone have access to memory 140, thereby making the CDIs and other secrets unavailable to other systems. In some embodiments, memory 140 may be a local memory or a local cache in DPE 120. In some embodiments, memory 140 can store machine-readable instructions and/or commands that can be performed by processor 145. For example, memory 140 can store instructions related to one or more commands (e.g., commands 210A-210I described with reference to FIG. 2) as machine-readable instructions, and processor 145 may execute these instructions.

Also, for example, DPE 105 can run cryptographic tasks that a traditional DICE protocol may require. Another advantage may be that DPE 105 may serve as an acceleration device that accelerates cryptographic subtasks by running them in parallel, and/or as a background process, while other tasks in a DICE protocol continue to be performed. This may free up compute resources, and speed up generation of CDI certificate 135.

In some embodiments, DPE 105 can receive from client computing device 110 and via secure communication channel 115, context data 150 associated with a cryptographic subtask of the task. The cryptographic subtask may be any task that supports an output of DPE 105. For example, the cryptographic subtask may be the generation of attestation CDI 155 and/or sealing CDI 160, that in turn enable DICE 105A to output CDI certificate 135. Additional and/or alternative cryptographic subtasks may be performed by DPE 105. Context data 150 may generally refer to data that is exchanged between DPE 105 and client computing device 110, and context data 150 indicates an internal state of DPE 105. In some embodiments, the cryptographic subtask may relate to a seeding operation to initialize a new and/or additional DICE context, apply a software application policy, or both.

In some embodiments, the computing device can execute, by the secure component, the cryptographic subtask based on the input data and the context data. For example, DPE 105 can perform operations related to hashing, pairing cryptographic keys, encrypting and/or decrypting data, and so forth. In some embodiments, the cryptographic subtask may relate to a generation of an attestation certificate for a software application of a plurality of software applications on the computing device. In such embodiments, the generation of the attestation certificate may be associated with an internal attribute. In some embodiments, the cryptographic subtask can include sealing a password into the DICE. In such embodiments, the sealing may be bound to one or more version clamps. In some such embodiments, the sealing may be bound to one or more internal versions. In some embodiments, the sealing may be associated with one or more internal attributes.

In some embodiments, the secure component can provide, to the client computing device via the secure communication channel, an output of the cryptographic subtask. For example, DPE 105 may generate attestation CDI 155 and sealing CDI 160. Attestation CDI 155 and sealing 160 are secrets and DPE 105 would store these secrets and not reveal these secrets. However, DPE 105 can provide an output indicative of attestation CDI 155 and sealing 160. For example, the output of the cryptographic subtask may be CDI certificate 135.

As described herein, in some embodiments, attestation CDI 155 can be derived from a combination of input data 125 (e.g., code 125A, authority data 125B, config data 125C, mode decision 125D, and/or hidden inputs 130), received from client computing device 110, and provided to DICE 105A. In some embodiments, input data 125 includes code data 125A and configuration data 125C, and the executing of the cryptographic subtask can involve generating attestation CDI 155 based on input data 125. Generally, attestation CDI 155 will change its value when a software is updated (e.g., code 125A changes its value), and/or a configuration is changed (e.g., config data 125C is updated). Also, in some embodiments, input data includes authority data 125B, mode decision 125D, and a hidden input data 130, and the executing of the cryptographic subtask involves generating sealing CDI 160 based on input data 125. Sealing CDI 160 can be derived from authority data 125B, mode decision 125D, and/or hidden inputs 130, as such data is not susceptible to changes to a software code or changes to a configuration.

Subsequently, CDI certificate 135 can be output by DICE 105A and/or DPE 105. For example, a particular portion of DICE 105A may receive input data 125, and transmit context data 150 for a particular software application or a session to DPE 105. DPE 105 can then generate attestation CDI 155 and output CDI certificate 135 based on attestation CDI 155. For example, DPE 105 can derive a subject key pair (e.g., for a target software application) from attestation CDI 155. Also, DPE 105 can derive an authority key pair, which signs CDI certificate 135, from UDS 120 (during a hardware to software transition), or from an attestation CDI for currently running code (during a software to software transition). Also, for example, a public key associated with UDS 120 can be made available when UDS 120 is configured during the manufacturing process. In some embodiments, the executing of the cryptographic subtask involves generating a CDI based on input data 110 and context data 150, and the output of the cryptographic subtask is CDI certificate 135. Accordingly, DPE 105 may store the CDI, one or more cryptographic keys associated with the CDI, and one or more private certificate keys associated with the CDI certificate, in memory 140. Also, for example, the providing of the output of the cryptographic subtask involves providing CDI certificate 135 to client computing device 110 via the secure communication channel 115.

Some embodiments involve identifying that a trusted execution environment (TEE) has been initialized for the secure component, and wherein the executing of the cryptographic subtask comprises executing the DICE protocol at the secure component within the TEE. For example, DPE 105 may be initiated part way through a system boot process and may itself be part of a tree of operations performed by DICE 105A. For example, a system may run without DPE 105 until a TEE is initialized, and then all future operations in the DICE protocol 105A may be protected by DPE 105, that may be running in the TEE (which may be able to attest its own state). However, this type of approach may involve security trade-offs as compared to, for example, a discrete DPE paired with a main SoC boot ROM. Implementation decisions can be based on various parameters of a particular computing device, types of software applications running on the computing device, available memory allocations, processor speed, and so forth.

As described herein, DPE 105 implements the DICE protocol by executing one or more DICE computations internally. In some embodiments, DPE 105 may include UDS 120 and internal inputs (e.g., hidden inputs 130). Sensitive outputs such as, for example, CDIs (e.g., attestation CDI 155, sealing CDI 160, and so forth), one or more sealing keys, and one or more certificate private keys remain within DPE 105, whereas output certificates (e.g., CDI certificate 135) are provided to a client and/or host computing device by DPE 105.

In some embodiments, DPE 105 may be one of: a system on a chip (SoC), a software application on a secure hardware element of the computing device, a software application in a trusted environment of the computing device, or an application on a virtual machine. For example, possible implementations of DPE 105 can include discrete hardware (which may also offer simultaneous and/or parallel TPM capabilities), an app on a secure element, an app in a trusted execution environment, or another kind of protected enclave, virtual machine (VM), or application program.

Generally, DICE-related secrets exist in plain-text only in the DPE 105. Instead of handling DICE secrets directly, a DPE client (e.g., a client and/or host computing device such as client computing device 110) can hold opaque context data 150 which enables it to issue subsequent commands to DPE 105. Such context data 150 may be a handle identifying actual data stored by DPE 105 (e.g., in memory 140), or it may be the actual data encrypted so only DPE 105 can decrypt it. Communication between client computing device 110 and DPE 105 can be encrypted using secure communication channel 115. Context data 150 can be for one time use, and may be bound to a single session. DPE 105 may generally not be stateless. DPE 105 can track valid context data 150, sessions, and the mapping between the two. The number of contexts supported by DPE 105 can be implementation specific.

Secure Channel

In some embodiments, the cryptographic subtask may relate to secure communication. For example, DPE 105 can be configured to support various secure channels (e.g., Noise_NK1_25519_AESGCM_SHA256). This can have a few implications. For example, DPE 105 can be the 'responder' for every negotiation, and may not authenticate an 'initiator.' Also, for example, the static identity of DPE 105 must already be known to the initiator. For example, this could be queried and written to SoC tamper-proof storage during manufacturing, when DPE 105 and main SoC are 'paired'.

In some embodiments, a static identity of DPE 105 can remain constant for its lifetime, because a client may not have mutable tamper-proof storage to rotate the identity.

In some embodiments, DPE 105 can be configured to support multiple secure sessions so each encrypted command and response message is prepended by a cleartext 16-bit session identifier.

In some embodiments, a DPE implementation may support other types of secure channels but the security properties can be similar.

Message Encoding

In some embodiments, the cryptographic subtask may relate to message encoding. For example, command and/or response messages generated by DPE 105 may be less than or equal to 65535 bytes in length, including encryption overhead. Messages may be encoded using a constrained subset of the RFC 8949 CBOR format. The intention of additional constraints is to promote implementation simplicity and correctness. Such additional constraints may include a (i) deterministically encoded CBOR, as specified in RFC 8949 section 4.2.1, (ii) floating point numbers and tags are not allowed, (iii) map keys, other than integers, can be disallowed.

Generally, Concise Binary Object Representation (CBOR) parsers in DPE can be configured to refuse to process commands that do not follow specified rules, and can be additionally configured to only generate CBOR responses that follow such rules. Each command and response can define a CBOR map for inputs and outputs, with each field being optional. This allows for flexibility in deployment.

Messages are described in this document using an open sourced version of the common development and distribution license (CDDL). CDDL sockets are used to indicate flexibility in choice types in different versions, and/or with vendor-defined extensions.

Encrypted Message Format

Commands and responses that are encrypted may be entirely encrypted except for a session ID, and can be encoded as a CBOR array as shown below:

```
encrypted-message = [
session-id: uint,
ciphertext: bytes,
]
```

When using a Noise secure channel the ciphertext can be a Noise 'transport message', which is simply an AEAD ciphertext.

Command and Response Headers

For every command message, the input fields described for the command are appended to a common header which identifies the command. Response messages have a similar header with an error code. This is the format of command and response messages where input_args and output_args are command-specific maps:

```
command-message = [
  command-id: $command-id,
  input-args: $input-args,
]
```

-continued

```
response-message = [
  error-code: $error-code,
  output-args: $output-args,
]
$command-id /= get-identity
$command-id /= open-session
$command-id /= close-session
$command-id /= initialize-context
$command-id /= derive-child
$command-id /= certify-key
$command-id /= seal
$command-id /= unseal
$command-id /= rotate-context
get-identity = 1
open-session = 2
close-session = 3
initialize-context = 4
derive-child = 5
certify-key = 6
seal = 7
unseal = 8
rotate-context = 9
$error-code /= no-error
$error-code /= internal-error
$error-code /= invalid-command
$error-code /= invalid-argument
$error-code /= argument-not-supported
no-error = 0
internal-error = 1
invalid-command = 2
invalid-argument = 3
$input-args /= get-identity-input-args
$input-args /= open-session-input-args
$input-args /= close-session-input-args
$input-args /= initialize-context-input-args
$input-args /= derive-child-input-args
$input-args /= certify-key-input-args
$input-args /= seal-input-args
$input-args /= unseal-input-args
$input-args /= rotate-context-input-args
$output-args /= get-identity-output-args
$output-args /= open-session-output-args
$output-args /= close-session-output-args
$output-args /= initialize-context-output-args
$output-args /= derive-child-output-args
Soutput-args /= certify-key-output-args
$output-args /= seal-output-args
$output-args /= unseal-output-args
$output-args /= rotate-context-output-args
```

DPE Commands

A DPE (e.g., DPE 105) can support the commands described herein. Command messages may consist of an 8-bit command identifier followed by zero or more input arguments. For encrypted commands, the entire command message may be encrypted, including the command identifier byte. All command and response messages are no more than 65535 bytes in length. Implementations may choose to limit this further.

Figure 2:
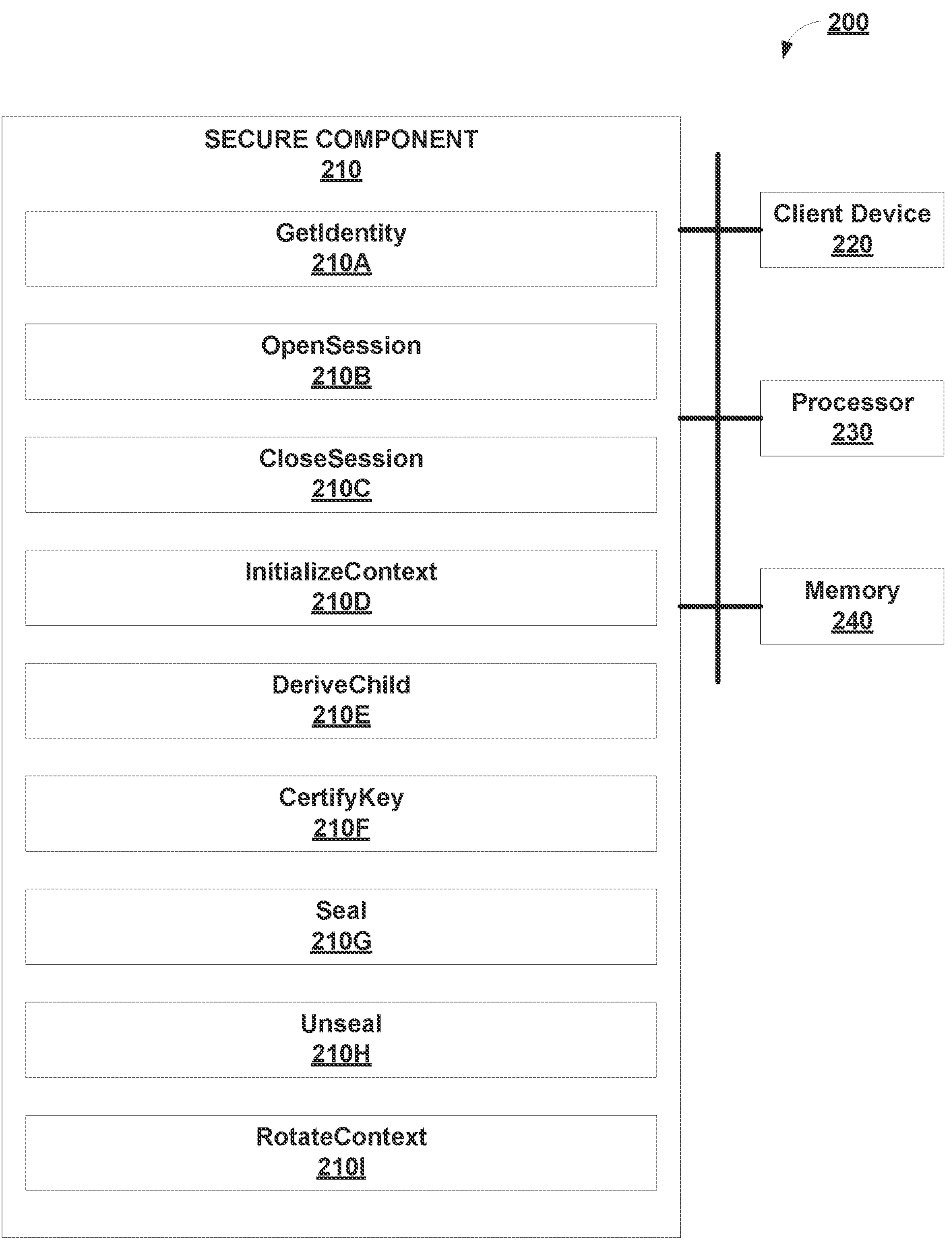
FIG. 2 is a diagram illustrating example commands executed by a secure component, in accordance with example embodiments.

FIG. 2 is a diagram illustrating example commands 200 executed by secure component 210, in accordance with example embodiments.

Secure component 210 (e.g., DPE 105 of FIG. 1) can execute a plurality of commands. Such commands may be executed in response to operations performed based on a DICE protocol or standard for client device 220, and may be executed by processor 230. Commands may be stored as machine-readable instructions in memory 240 to be executed by processor 230.

GetIdentity 210A command queries a DPE's static Diffie-Hellman identity, used for authenticating Noise_NK1 secure channels. In most cases this will only be called during a manufacturing or provisioning phase. Both the command and the response are plain-text and unauthenticated. The output is a 32-byte public key which serves as the DPE static identity. This is essentially a Noise handshake message<-s with a zero-length cleartext payload.

```
get-identity-input-args = { }
get-identity-output-args = {
   ? static-public-key => bytes .size 32
}
static-public-key = 1
```

OpenSession 210B command establishes a new encrypted session. Implementations that use a proprietary secure channel do not use this command, but rather use proprietary commands to negotiate the channel. The command and response messages are not encrypted except as specified for Noise protocol handshake messages. The command Noise payload is empty, and the response Noise payload contains the session ID as a CBOR unit.

```
open-session-input-args = {
   ? initiator-handshake => bytes
}
initiator-handshake = 1
open-session-output-args = {
   ? responder-handshake => bytes
}
responder-handshake = 1
responder-handshake-payload = uint ; The new session ID
```

CloseSession 210C command closes a session, causing any keys or context data bound to the session to be destroyed.

```
close-session-input-args = {
   ? session-id => uint,
}
session-id = 1
output-args = { }
```

InitializeContext 210D command initializes a new and/or additional DICE context. This can be done by starting with an internal UDS, an external UDS, a combined UDS, or one or more external CDI values. Only the input arguments that apply to the initialization type should be present.

```
initialize-context-input-args = {
   ? initialization-type => $initialization-type,
   ? external-uds => bytes,
   ? external-uds-seed => bytes,
   ? attestation-cdi => bytes,
   ? sealing-cdi => bytes,
}
```

-continued

```
$initialization-type /= init-internal-uds    ; Expects no additional args
$initialization-type /= init-external-uds    ; Expects external-uds
$initialization-type /= init-combined-uds    ; Expects external-uds-seed
$initialization-type /= init-external-cdi    ; Expects attestation-cdi,
sealing-cdi
init-internal-uds = 1
init-external-uds = 2
init-combined-uds = 3
init-external-cdi = 4
initialization-type = 1
external-uds = 2
external-uds-seed = 3
attestation-cdi = 4
sealing-cdi = 5
initialize-context-output-args = {
   ? new-dice-context => bytes,
}
new-dice-context = 1
```

DeriveChild 210E command performs the DICE computation on a given set of inputs. In a sense this may be a significant DICE operation, and the other commands may be either made possible by this command, or may exist to make this command possible.

In some embodiments, inputs may be up to a caller and may be opaque or may adhere to a profile or convention supported by the DPE implementation. It is expected that the DPE may also have internal inputs to optionally contribute to the derivation, and the caller may select any number of those. Implementations choose whether to support any internal inputs and define the format and semantics when supported, including whether an input adds additional information to the generated certificate.

In some embodiments, a parent DICE context can be discarded or retained. Also, for example, if a child context is known to belong to a program that should not be deriving additional DICE contexts, for example an application, then the caller can specify that further derivation is not allowed. This is a bit like specifying CA pathLen=0 in X.509v3 basicConstraints, and for DPEs which support X.509 certificates, they may set this constraint on the corresponding certificate.

In some embodiments, a caller can specify that a child context is to be associated with a new session by initiating the new session. The new session can be negotiated, for example, using Noise NK1psk2 using the current session key as the pre-shared key (psk).

In some embodiments, a version clamp slot can be set as part of such an operation. Doing so will populate the slot with a given maximum value, and consume the slot for a lifetime of a child DICE context (including its own child contexts). Omitting the version-clamp input arguments may place no additional constraints on sealing/unsealing versions for the context. Version clamp slot zero can be reserved for the version of the DPE itself.

```
derive-child-input-args = {
   ? dice-context => bytes,
? retain-parent-context => bool, ; Default = false
   ? allow-child-to-derive => bool, ; Default = true
   ? new-session-initiator-handshake => bytes
   ? version-clamp-max-value => uint,
   ? version-clamp-slot => uint,
   ? dice-input-data-type => $dice-input-data-type,
   ? dice-input-data => bytes,
   ? internal-inputs => [* $internal-input-type]
}
```

-continued

```
$dice-input-data-type /= opaque-input   ; Raw input used with no interpretation
$dice-input-data-type /= open-dice-input   ; Specified by the Open Profile for DICE
opaque-input = 1
open-dice-input = 2
$internal-input-type /= DPE-info   ; Internal info like version, configuration, etc
$internal-input-type /= DPE-dice   ; Internal DICE state and cert chain
$internal-input-type /= rotation-value
$internal-input-type /= monotonic-counter
$internal-input-type /= vendor-defined   ; Placeholder for vendor-defined inputs
DPE-info = 1
DPE-dice = 2
rotation-value = 128
monotonic-counter = 256
vendor-defined = 4096
dice-context = 1
retain-parent-context = 2
allow-child-to-derive = 3
new-session-initiator-handshake = 4
version-clamp-max-value = 5
version-clamp-slot = 6
dice-input-data-type = 7
dice-input-data = 8
derive-child-output-args = {
  ? new-dice-context => bytes,
? new-session-responder-handshake => bytes, ; If new session initiated
  ? parent-dice-context => bytes, ; If retained
}
new-dice-context = 1
new-session-responder-handshake = 2
parent-dice-context = 3
```

CertifyKey 210F command certifies an attestation key using the given DICE context as the certification authority. As described herein, the DICE context can be discarded or retained. If the public key to certify is not provided as an input argument, a new key pair can be generated, certified, and/or provided in the response in CBOR Object Signing and Encryption (COSE) format. An entire certificate chain may be returned in leaf-first order. In some embodiments, the chain may have at least two entries: a new leaf certificate, and an issuing DICE certificate.

```
certify-key-input-args = {
  ? dice-context => bytes,
  ? retain-context => bool, ; Default = false
  ? certificate-type => $certificate-type,
  ? cose-public-key => bytes,
}
$certificate-type /= x509
$certificate-type /= cbor
dice-context = 1
retain-context = 2
certificate-type = 3
cose-public-key = 4
certify-key-output-args = {
  ? certificate-chain => [2* bytes],
  ? new-cose-key => bytes,
  ? new-dice-context => bytes, ; If retained
}
certificate-chain = 1
new-cose-key = 2
```

Seal 210G command seals data to a given set of versions. In some embodiments, each version may be mapped to a version clamp slot that was assigned a maximum version by a previous DeriveChild call for the given DICE context. Slots not explicitly clamped can assume a default maximum of zero, and slots not represented in the input arguments can assume a default version of zero. Each of the provided versions can be configured to be less than or equal to the corresponding maximum version in order to be unsealed by the current context. Versions larger than the maximum may be supplied, but then the sealed data would be bound to a future version, and may not be unsealed using the current context.

```
seal-input-args = {
  ? dice-context => bytes,
  ? retain-context => bool, ; Default = false
  ? versions => [* uint]
  ? data-to-scal => bytes,
}
dice-context = 1
retain-context = 2
versions = 3
data-to-seal = 4
seal-output-args = {
  ? sealed-data => bytes,
  ? new-dice-context => bytes, ; If retained
}
sealed-data = 1
new-dice-context = 2
```

Unseal 210H command unseals data previously sealed to a given set of versions. Each version can be mapped to a version clamp slot that was assigned a maximum version by a previous DeriveChild call for the given DICE context. Slots not explicitly clamped can assume a default maximum of zero, and slots not represented in the input arguments can assume a default version of zero. Each of the provided versions can be configured to be less than or equal to the corresponding maximum version.

```
unscal-input-args = {
  ? dice-context => bytes,
  ? retain-context => bool, ; Default = false
  ? versions => [* uint]
  ? data-to-unseal => bytes,
}
dice-context = 1
retain-context = 2
versions = 3
```

-continued

```
data-to-unseal = 4
unscal-output-args = {
  ? unsealed-data => bytes,
  ? new-dice-context => bytes, ; If retained
}
unsealed-data = 1
new-dice-context = 2
```

RotateContext 210I command rotates a DICE context in a way that existing context data is invalidated. This may be useful when DICE context data flows through a system in a way that is temporarily secure, but may be later discovered by an unauthorized party, for example, a kernel command line. If the authorized component can store the DICE context more securely than the way it was originally received, it can call this command to guarantee that the only valid context data for the component is the new context data, and no copies exist. For example, the DPE may use a new key to encrypt the same DICE context data.

```
rotate-context-input-args = {
  ? dice-context => bytes,
}
dice-context = 1
rotate-context-output-args = {
  ? new-dice-context => bytes,
}
new-dice-context = 1
```

Computing Device Architecture

Figure 3:
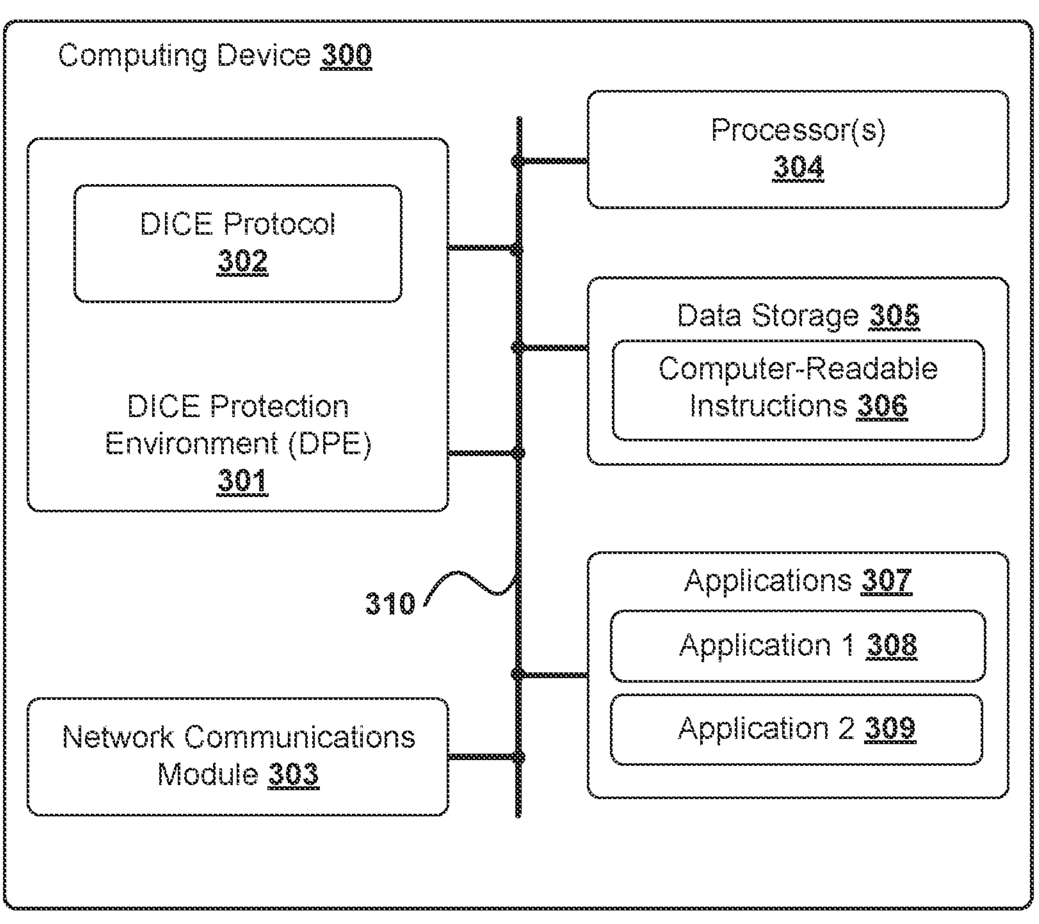
FIG. 3 is a block diagram of a computing device, in accordance with example embodiments.

FIG. 3 is a block diagram of an example computing device 300, in accordance with example embodiments. In particular, computing device 300 shown in FIG. 3 can be configured to perform at least one function of and/or related to a conditioned, axial self-attention based neural network, and/or method 400.

Computing device 300 may include device identifier composition engine (DICE) protection environment (DPE) 301 (also referred to herein as a secure component), that implements DICE protocol 302, a network communications module 303, one or more processors 304, data storage 305, one or more software applications 307, such as application 1 308, application 2 309, and so forth, all of which may be linked together via a system bus, network, or other connection mechanism 310.

DICE protocol 302 may share aspects similar to DICE 105A of FIG. 1. In particular. DICE protocol 302 may involve tasks based on a DICE standard or protocol, as described with reference to FIG. 1. Likewise, DPE 301 may share aspects similar to DPE 105 of FIG. 1.

Network communications module 303 can include one or more devices that provide one or more wireless interfaces and/or one or more wireline interfaces that are configurable to communicate via a network. Wireless interface(s) can include one or more wireless transmitters, receivers, and/or transceivers, such as a Bluetooth™ transceiver, a Zigbee®) transceiver, a Wi-Fi™ transceiver, a WiMAX™ transceiver, an LTE™ transceiver, and/or other type of wireless transceiver configurable to communicate via a wireless network. Wireline interface(s) can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some examples, network communications module 303 can be configured to provide reliable, secured, and/or authenticated communications. For each communication described herein, information for facilitating reliable communications (e.g., guaranteed message delivery) can be provided, perhaps as part of a message header and/or footer (e.g., packet/message sequencing information, encapsulation headers and/or footers, size/time information, and transmission verification information such as cyclic redundancy check (CRC) and/or parity check values). Communications can be made secure (e.g., be encoded or encrypted) and/or decrypted/decoded using one or more cryptographic protocols and/or algorithms, such as, but not limited to, Data Encryption Standard (DES), Advanced Encryption Standard (AES), a Rivest-Shamir-Adelman (RSA) algorithm, a Diffie-Hellman algorithm, a secure sockets protocol such as Secure Sockets Layer (SSL) or Transport Layer Security (TLS), and/or Digital Signature Algorithm (DSA). Other cryptographic protocols and/or algorithms can be used as well or in addition to those listed herein to secure (and then decrypt/decode) communications.

One or more processors 304 can include one or more general purpose processors, and/or one or more special purpose processors (e.g., digital signal processors, tensor processing units (TPUs), graphics processing units (GPUs), application specific integrated circuits, etc.). One or more processors 304 can be configured to execute computer-readable instructions 306 that are contained in data storage 305 and/or other instructions as described herein, for example, with reference to commands in FIG. 2.

Data storage 305 can include one or more non-transitory computer-readable storage media that can be read and/or accessed by at least one of one or more processors 304. The one or more computer-readable storage media can include volatile and/or non-volatile storage components, such as optical, magnetic, organic or other memory or disc storage, which can be integrated in whole or in part with at least one of one or more processors 304. In some examples, data storage 305 can be implemented using a single physical device (e.g., one optical, magnetic, organic or other memory or disc storage unit), while in other examples, data storage 305 can be implemented using two or more physical devices.

Data storage 305 can include computer-readable instructions 306 and perhaps additional data. In some examples, data storage 305 can include storage required to perform at least part of the herein-described methods, scenarios, and techniques and/or at least part of the functionality of the herein-described devices and networks. In some examples, data storage 305 can include memory 140 of FIG. 1. In particular of these examples, computer-readable instructions 306 can include instructions that, when executed by processor(s) 304, enable computing device 300 to provide for some or all of the functionality described with reference to FIGS. 1 and/or 2.

Computing device 300 may include a user interface module that can be operable to send data to and/or receive data from external user input/output devices. For example, the user interface module can be configured to send and/or receive data to and/or from user input devices such as a touch screen, a computer mouse, a keyboard, a keypad, a touch pad, a trackball, a joystick, a voice recognition module, and/or other similar devices. The user interface module can also be configured to provide output to user display devices, such as one or more cathode ray tubes (CRT), liquid crystal displays, light emitting diodes (LEDs), displays using digital light processing (DLP) technology, printers, light bulbs, and/or other similar devices, either now known or later developed. The user interface module can also be configured to generate audible outputs, with devices such as a speaker, speaker jack, audio output port, audio output device, earphones, and/or other similar devices. The user interface module can further be configured with one or more haptic devices that can generate haptic outputs, such as vibrations and/or other outputs detectable by touch and/or physical contact with computing device 300. In some examples, the user interface module can be used to provide a graphical user interface (GUI) for utilizing computing device 300, such as, for example, a graphical user interface of a mobile phone device.

Applications 307 may be a plurality of software applications capable of running on computing device 300. In some embodiments, DICE protocol 302 and DPE 301 may enable a transition from hardware to software during a boot process, and may enable running of, say application 1 308. Subsequently, DICE protocol 302 and DPE 301 may enable a transition from application 1 308 to application 2 309 by performing additional validation operations as described with reference to FIGS. 1 and 2.

Example Methods of Operation

FIG. 4 is a flowchart of a method 400, in accordance with example embodiments. Method 400 can be executed by a computing device, such as computing device 300. Method 400 can begin at block 410, where the method can involve receiving, by a secure component and from a client computing device via a secure communication channel, input data for a task associated with the client computing device, wherein the task is based on a device identifier composition engine (DICE) protocol, and wherein the secure component is to perform a cryptographic subtask of the task.

At block 420, the method can involve receiving, by the secure component and from the client computing device via the secure communication channel, context data associated with the cryptographic subtask.

At block 430, the method can involve executing, by the secure component, the cryptographic subtask based on the input data and the context data.

At block 440, the method can involve providing, by the secure component and to the client computing device via the secure communication channel, an output of the cryptographic subtask.

In some embodiments, the computing device can manage, at the secure component, one or more policies associated with the context data, wherein the one or more policies are configured to prevent one or more of: data leakage of the context data, unauthorized access to the context data, or exfiltration of the context data.

In some embodiments, the computing device can accelerate, at the secure component, the cryptographic subtask.

In some embodiments, the computing device can implement, at the secure component, a versioned key derivation function (KDF) for sealing, wherein one or more version clamps are set during boot, and enforced for sealing key derivation.

In some embodiments, the secure component may be one of: a system on a chip (SoC), a software application on a secure hardware element of the computing device, a software application in a trusted environment of the computing device, or an application on a virtual machine.

Some embodiments involve identifying the task during a system boot process of the DICE protocol.

Some embodiments involve identifying that a trusted execution environment (TEE) has been initialized for the secure component, and wherein the executing of the cryptographic subtask includes executing the DICE protocol at the secure component within the TEE.

In some embodiments, the context data can be a single use data, and the context data can be bound to a single session of the task. In such embodiments, the computing device can perform data rotation of the context data, wherein the data rotation includes invalidating existing context data for a current session to prevent use in a future session.

In some embodiments, the cryptographic subtask may relate to an initialization of an additional DICE context, a software application policy, or both.

In some embodiments, the cryptographic subtask may relate to a generation of an attestation certificate for a software application of a plurality of software applications on the computing device. In such embodiments, the generation of the attestation certificate may be associated with an internal attribute.

In some embodiments, the cryptographic subtask can include sealing a password into the DICE. In such embodiments, the sealing may be bound to one or more version clamps. In some such embodiments, the sealing may be bound to one or more internal versions. In some embodiments, the sealing may be associated with one or more internal attributes.

In some embodiments, the cryptographic subtask may relate to message encoding.

In some embodiments, the cryptographic subtask may relate to secure communication.

In some embodiments, the receiving of the context data can include receiving the context data in an encrypted format, wherein a decrypting of the encrypted format is restricted to the secure component. In such embodiments, the computing device can decrypt, by the secure component, the context data in the encrypted format.

In some embodiments, the computing device can delete, by the secure component, the context data subsequent to the executing of the cryptographic subtask.

In some embodiments, the secure component can be a second computing device communicatively linked to the client computing device.

In some embodiments, the secure component can be hosted in a secured environment in the client computing device.

Some embodiments involve identifying, by the secure component, that the client computing device is initiating the DICE protocol. Such embodiments also involve establishing, by the secure component and in response to the identifying, the secure communication channel.

In some embodiments, the secure component can store a unique device secret (UDS) associated with the client computing device.

In some embodiments, the output of the cryptographic subtask can be a compound device identifier (CDI) certificate.

In some embodiments, the input data may include one or more of code data, authority data, configuration data, mode decision, or a hidden input data.

In some embodiments, the input data may include code data and configuration data, and wherein the executing of the cryptographic subtask involves generating an attestation compound device identifier based on the input data.

In some embodiments, the input data may include authority data, mode decision, and a hidden input data, and wherein the executing of the cryptographic subtask involves generating a sealing compound device identifier based on the input data.

In some embodiments, the executing of the cryptographic subtask involves generating a compound device identifier (CDI) based on the input data, and wherein the output of the cryptographic subtask can be a CDI certificate, and the method involves storing, in the secure component, the CDI, one or more cryptographic keys associated with the CDI, and one or more private certificate keys associated with the CDI certificate, and wherein the providing of the output of the cryptographic subtask comprises providing the CDI certificate to the client computing device.

FIG. 5 is a flowchart of a method 500, in accordance with example embodiments. Method 500 can be executed by a computing device, such as computing device 300. Method 500 can begin at block 510, where the method can involve initializing a secure component during execution of a device identifier composition engine (DICE) protocol for booting an operating system of a client computing device.

At block 520, the method can involve receiving, by the secure component and from the client computing device via a secure communication channel, encrypted context data for a cryptographic subtask of a task associated with the DICE protocol, wherein the secure component is to perform the cryptographic subtask.

At block 530, the method can involve determining, by the secure component and based on a decrypted version of the context data, a compound device identifier (CDI) value associated with the cryptographic subtask.

At block 540, the method can involve generating, by the secure component and based on the CDI value, a CDI certificate for the cryptographic subtask.

At block 550, the method can involve restricting access to the decrypted version of the context data to the secure component.

At block 560, the method can involve transferring control of the DICE protocol to a target component in the booting of the operating system by providing the CDI certificate. Some embodiments may involve providing the CDI value in an encrypted format.

In some embodiments, access to the CDI value may be restricted to the secure component.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as non-transitory computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are provided for explanatory purposes and are not intended to be limiting, with the true scope being indicated by the following claims.

What is claimed is:

1. A computer-implemented method, comprising:

receiving, by a secure component and from a client computing device via a secure communication channel, input data for a task associated with the client computing device, wherein the task is based on a device identifier composition engine (DICE) protocol, and wherein the secure component is to perform a cryptographic subtask of the task;

receiving, by the secure component and from the client computing device via the secure communication channel, context data associated with the cryptographic subtask, wherein the context data indicates an internal state of the secure component, the internal state being related to the cryptographic subtask, and wherein the secure component manages one or more policies associated with the context data to prevent unauthorized access or leakage;

executing, by the secure component, the cryptographic subtask based on the input data and the context data; and providing, by the secure component and to the client computing device via the secure communication channel, an output of the cryptographic subtask.

2. The computer-implemented method of claim 1, further comprising:

accelerating, at the secure component, the cryptographic subtask.

3. The computer-implemented method of claim 1, further comprising:

implementing, at the secure component, a versioned key derivation function (KDF) for sealing, wherein one or more version clamps are set during boot, and enforced for sealing key derivation.

4. The computer-implemented method of claim 1, wherein the secure component is one of: a system on a chip (SoC), a software application on a secure hardware element of the computing device, a software application in a trusted environment of the computing device, or an application on a virtual machine.

5. The computer-implemented method of claim 1, further comprising:

identifying the task during a system boot process of the DICE protocol.

6. The computer-implemented method of claim 1, further comprising:

identifying that a trusted execution environment (TEE) has been initialized for the secure component, and wherein the executing of the cryptographic subtask comprises executing the DICE protocol at the secure component within the TEE.

7. The computer-implemented method of claim 1, wherein the context data is a single use data, and wherein the context data is bound to a single session of the task.

8. The computer-implemented method of claim 1, further comprising:

performing data rotation of the context data, wherein the data rotation comprises invalidating existing context data for a current session to prevent use in a future session.

9. The computer-implemented method of claim 1, wherein the cryptographic subtask relates to an initialization of an additional DICE context, a software application policy, or both.

10. The computer-implemented method of claim 1, wherein the cryptographic subtask relates to a generation of an attestation certificate for a software application of a plurality of software applications on the computing device.

11. The computer-implemented method of claim 10, wherein the generation of the attestation certificate is associated with an internal attribute.

12. The computer-implemented method of claim 1, wherein the cryptographic subtask further comprises:

sealing a password into the secure component.

13. The computer-implemented method of claim 12, wherein the sealing is bound to one or more version clamps for a software application of a plurality of software applications on the computing device.

14. The computer-implemented method of claim 13, wherein the sealing is bound to one or more internal versions.

15. The computer-implemented method of claim 12, wherein the sealing is associated with one or more internal attributes.

16. The computer-implemented method of claim 1, wherein the cryptographic subtask relates to message encoding.

17. The computer-implemented method of claim 1, wherein the cryptographic subtask relates to secure communication.

18. The computer-implemented method of claim 1, wherein the receiving of the context data comprises receiving the context data in an encrypted format, wherein a decrypting of the encrypted format is restricted to the secure component, and the method further comprising:

decrypting, by the secure component, the context data in the encrypted format.

19. The computer-implemented method of claim 1, further comprising:

deleting, by the secure component, the context data subsequent to the executing of the cryptographic subtask.

20. The computer-implemented method of claim 1, wherein the secure component is a second computing device communicatively linked to the client computing device.

21. The computer-implemented method of claim 1, wherein the secure component is hosted in a secured environment in the client computing device.

22. The computer-implemented method of claim 1, further comprising:

identifying, by the secure component, that the client computing device is initiating the DICE protocol; and establishing, by the secure component and in response to the identifying, the secure communication channel.

23. The computer-implemented method of claim 1, wherein the secure component stores a unique device secret (UDS) associated with the client computing device.

24. The computer-implemented method of claim 1, wherein the output of the cryptographic subtask is a compound device identifier (CDI) certificate.

25. The computer-implemented method of claim 1, wherein the input data comprises one or more of code data, authority data, configuration data, mode decision, or a hidden input data.

26. The computer-implemented method of claim 1, wherein the input data comprises code data and configuration data, and wherein the executing of the cryptographic subtask comprises generating an attestation compound device identifier based on the input data.

27. The computer-implemented method of claim 1, wherein the input data comprises authority data, mode decision, and a hidden input data, and wherein the executing of the cryptographic subtask comprises generating a sealing compound device identifier based on the input data.

28. The computer-implemented method of claim 1, wherein the executing of the cryptographic subtask comprises generating a compound device identifier (CDI) based on the input data, and wherein the output of the cryptographic subtask is a CDI certificate, and the method further comprising:

storing, in the secure component, the CDI, one or more cryptographic keys associated with the CDI, and one or more private certificate keys associated with the CDI certificate, and wherein the providing of the output of the cryptographic subtask comprises providing the CDI certificate to the client computing device.

29. The computer-implemented method of claim 1, wherein the one or more policies associated with the context data relates to the DICE protocol.

30. The computer-implemented method of claim 1, wherein the context data is an opaque handle or an encrypted data object that the secure component can interpret.

31. The computer-implemented method of claim 1, wherein the context data is a single-use data bound to a single session, and managed by the secure component to prevent reuse.

32. A computing device, comprising:

one or more processors; and data storage, wherein the data storage has stored thereon computer-executable instructions that, when executed by the one or more processors, cause the computing device to carry out functions comprising:

receiving, by a secure component and from a client computing device via a secure communication channel, input data for a task associated with the client computing device, wherein the task is based on a device identifier composition engine (DICE) protocol, and wherein the secure component is to perform a cryptographic subtask of the task;

receiving, by the secure component and from the client computing device via the secure communication channel, context data associated with the cryptographic subtask, wherein the context data indicates an internal state of the secure component, the internal state being related to the cryptographic subtask, and wherein the secure component manages one or more policies associated with the context data to prevent unauthorized access or leakage;

executing, by the secure component, the cryptographic subtask based on the input data and the context data; and providing, by the secure component and to the client computing device via the secure communication channel, an output of the cryptographic subtask.

33. An article of manufacture comprising one or more non-transitory computer readable media having computer-readable instructions stored thereon that, when executed by one or more processors of a computing device, cause the computing device to carry out functions comprising:

receiving, by a secure component and from a client computing device via a secure communication channel, input data for a task associated with the client computing device, wherein the task is based on a device identifier composition engine (DICE) protocol, and wherein the secure component is to perform a cryptographic subtask of the task;

receiving, by the secure component and from the client computing device via the secure communication channel, context data associated with the cryptographic subtask, wherein the context data indicates an internal state of the secure component, the internal state being related to the cryptographic subtask, and wherein the secure component manages one or more policies associated with the context data to prevent unauthorized access or leakage;

executing, by the secure component, the cryptographic subtask based on the input data and the context data; and providing, by the secure component and to the client computing device via the secure communication channel, an output of the cryptographic subtask.

* * * * *